United States Patent [19]

Dimitroff et al.

[11] 4,210,103
[45] Jul. 1, 1980

[54] FUEL SYSTEM FOR AND A METHOD OF OPERATING A SPARK-IGNITED INTERNAL COMBUSTION ENGINE

[75] Inventors: Edward Dimitroff; John A. Vitkovits, both of San Antonio, Tex.

[73] Assignee: Southwest Research Institute, San Antonio, Tex.

[21] Appl. No.: 784,414

[22] Filed: Apr. 4, 1977

[51] Int. Cl.$^2$ .............................................. F02B 47/04
[52] U.S. Cl. ........................................ 123/1 A; 123/3;
123/25 R; 123/575; 123/557
[58] Field of Search ............... 123/1 A, 3, 25 R, 127,
123/122 E; 60/279, 309; 261/18 R

[56] References Cited

U.S. PATENT DOCUMENTS

| | | | |
|---|---|---|---|
| 1,552,995 | 9/1925 | McKenzie-Martyn | 123/127 |
| 2,295,209 | 9/1942 | Guiles et al. | 123/3 |
| 2,420,325 | 5/1947 | Nettel | 123/3 |
| 2,716,398 | 8/1955 | McMullen | 123/119 R |
| 3,167,913 | 2/1965 | Muhlberg et al. | 60/39.02 |
| 3,749,376 | 7/1973 | Alm et al. | 123/1 A |
| 3,817,221 | 6/1974 | Nohira et al. | 123/25 |
| 3,930,476 | 6/1976 | Koch | 123/3 |
| 3,968,775 | 7/1976 | Harpman | 123/122 E |
| 3,986,350 | 10/1976 | Schmidt | 123/3 |
| 4,004,554 | 1/1977 | Kosaka et al. | 123/3 |
| 4,031,864 | 6/1977 | Crothers | 123/1 A |
| 4,036,180 | 7/1977 | Noguchi et al. | 123/3 |

FOREIGN PATENT DOCUMENTS

| | | | |
|---|---|---|---|
| 2311374 | 9/1973 | Fed. Rep. of Germany | 123/1 A |
| 2450240 | 5/1976 | Fed. Rep. of Germany | 123/1 A |
| 2501250 | 7/1976 | Fed. Rep. of Germany | 123/3 |

Primary Examiner—Charles J. Myhre
Assistant Examiner—Craig R. Feinberg
Attorney, Agent, or Firm—Marvin B. Eickenroht; Jennings B. Thompson

[57] ABSTRACT

There is disclosed a spark-ignited internal combustion engine wherein a blend of gasoline and alcohol is separated into its gasoline and alcohol phases, with the gasoline being atomized within an induction system, and the alcohol being dissociated into vapors which are mixed with the atomized gasoline in the induction system to provide the fuel for the engine.

34 Claims, 2 Drawing Figures

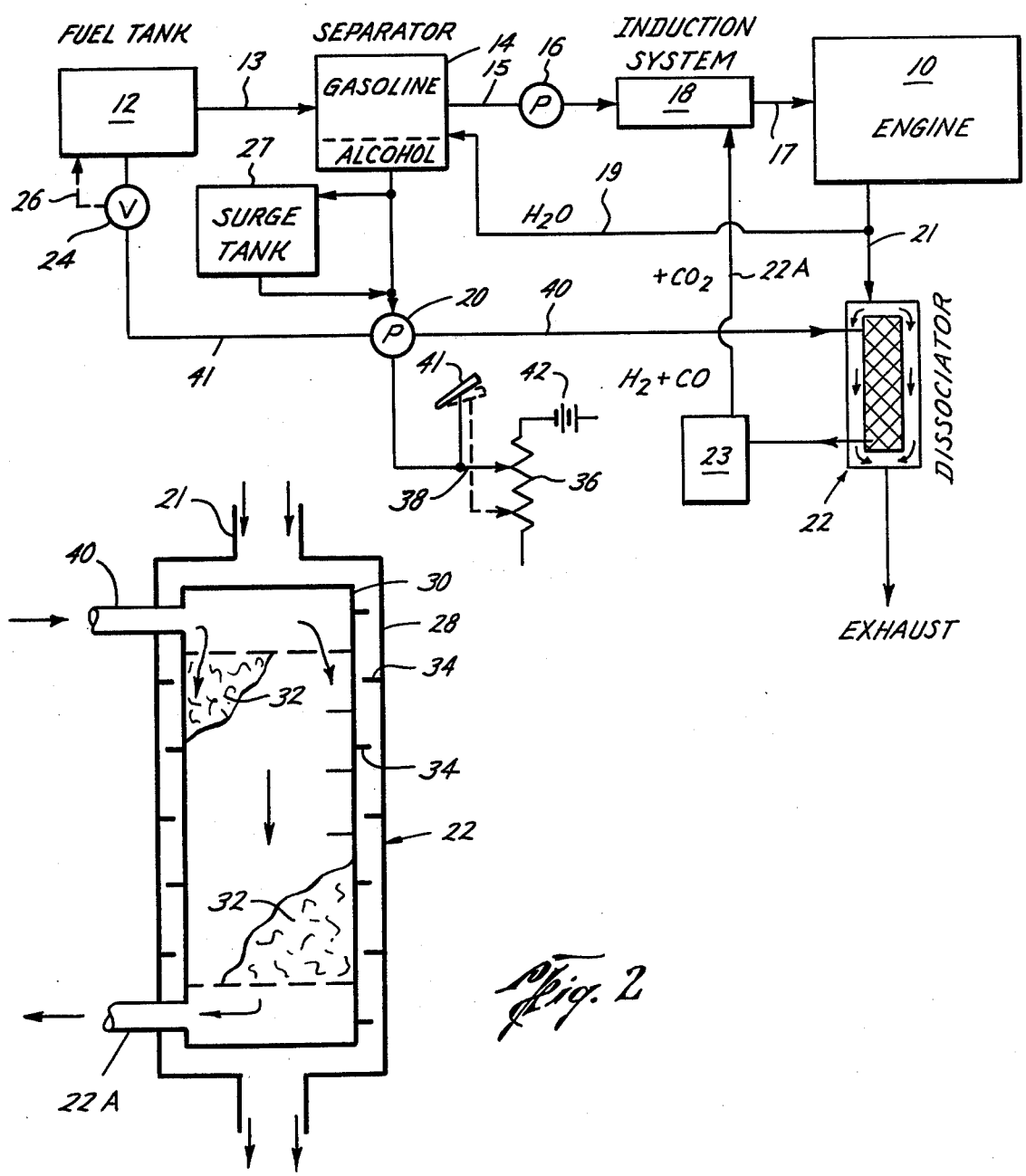

FUEL SYSTEM FOR AND A METHOD OF OPERATING A SPARK-IGNITED INTERNAL COMBUSTION ENGINE

This invention relates to an improved fuel system for a spark-ignited internal combustion engine and a method of operating the engine using such a system.

The need for finding alternative sources of fuel has become critical in view of the rapidly decreasing petroleum reserves from which gasoline is made. Sources which have in the past and are now receiving considerable attention in this respect are hydrocarbon alcohols, such as methyl alcohol, ethyl alcohol, propyl alcohol and isopropyl alcohol, all of which are of 1 to 3 carbon atoms. Of these alcohols, methyl alcohol or methanol is preferred, because, among other things, it can be produced from non-petroleum sources, such as coal.

However, if alcohols of this type are supplied to the induction system, similarly to gasoline, several design changes must be made in the induction system and engine in order to obtain proper combustion. Furthermore, not all of these changes can be made in existing engines.

It has also been suggested that the methanol be cracked into its component vapors including hydrogen, carbon monoxide and carbon dioxide which are then supplied to the engine. In addition to requiring a modified engine and induction system, this method of operating the engine requires catalysts, such as reduced copper and nickel, in order to crack the alcohol. These catalysts are not only expensive, but also must be replaced periodically in order to maintain the cracking efficiency.

Efforts to use a blend of alcohol and gasoline as a fuel for operating engines of this type having conventional induction systems have encountered several problems. For one thing, there is a significant deterioration of drivability due to the engine's "leaning" effect—i.e., the response to acceleration decreases as more alcohol is added to the blend. Also, the blends are water sensitive, so that a little water in the fuel tank causes the blend to separate into its phases, resulting in serious engine malfunctions. Furthermore, the alcohol will evaporate in hot climates, thus causing vapor lock, and it is difficult to maintain the alcohol and gasoline in a blend at subfreezing temperatures. Still further, when the alcohol contacts lead, magnesium, aluminum and certain plastics, such as may be used in the induction system, it causes corrosion and degradation.

It is therefore the primary object of the present invention to provide a fuel system for and a method of operating a spark-ignited internal combustion engine which may use an alcohol-gasoline blend as a fuel without encountering the aforementioned problems.

Moreover, it is an aim of the present invention to provide such a fuel system for and a method of operating a spark-ignited internal combustion engine that produces lower CO, $NO_x$ and unburned hydrocarbon exhaust emissions than those produced from an engine that uses 100 percent gasoline as a fuel.

Further, it is an aim of the present invention to provide a fuel system for and a method of operating a spark-ignited internal combustion engine in which engine efficiency is improved over that which would be obtained with the use of a conventional fuel system.

Another object is to provide a fuel system and method of operating a spark-ignited internal combustion engine which permits dissociation of the alcohol without the necessity for a catalyst.

These and other objects are accomplished, in accordance with the illustrated embodiment of the present invention, by a fuel system for such an engine in which gasoline is atomized within an induction system, a hydrocarbon alcohol of 1 to 3 carbon atoms is dissociated into vapors including hydrogen, carbon monoxide and carbon dioxide, and the vapors and atomized gasoline are mixed in the induction system in order to provide a fuel for the engine. Since only the gasoline flows through the fuel pump and carburetor, there is no opportunity for the alcohol to cause corrosion of these parts. Furthermore, since the gasoline is introduced directly into a carburetor of the induction system and the vapors are introduced directly into the intake manifold of the induction system, there is no opportunity for vapor lock. Still further, since the alcohol is dissociated before induction into the engine, it is possible to take advantage of superior thermal efficiency of its vapors due to their wider ignitability range.

In the preferred operation of the engine, the amount of vapors mixed with the atomized gas is regulated in response to the mass ratio of air to gasoline being atomized in the induction system or the engine load. More particularly, only atomized gasoline is supplied to the engine until it starts, and less vapors are supplied to the induction system as the engine load increases, up to a point at which the supply of vapors is discontinued when the mass ratio of air to gasoline becomes greater than 13 to 1 or an engine load of greater than 60 percent. The addition of less vapors as the air to gasoline mass ratio increases has been found to provide a more complete combustion of the atomized gasoline at lower loads, which develops more engine power at a lower fuel consumption. Moreover, as is well known, the emissions from such an engine are greater at lower air to gasoline mass ratios and at certain engine load conditions, such as idle, and by adding the vapors at these lower ratios and conditions, CO, $NO_x$ and unburned hydrocarbon emissions are decreased as compared with a 100 percent gasoline fuel. However, it was found that these advantages are lost and begin to deteriorate when the air to gasoline mass ratio is greater than 13 to 1 or an engine load of greater than 60 percent.

Preferably, the alcohol is dissociated into its vapors within a chamber so disposed in the engine exhaust pipe as to be in heat exchange relation with the exhaust gas therein. More particularly, the alcohol is introduced into a thermal pyrolysis chamber which produces the vapors by heat alone, and thus without the use of catalysts.

It is also preferred that a blend of the gasoline and alcohol be stored in a fuel tank and then supplied to another tank in which they may be separated into their phases for supply to the carburetor and dissociator upon demand. In this manner, the system may be employed for operating the engine of a vehicle with a minimum of alteration of the fuel system, and the phase separation characteristics of alcohol-gasoline blends by the addition of water is changed from a handicap to an asset. In the illustrated embodiment of the invention, the blend is separated by water which is supplied to the separator tank from the exhaust system of the engine. Additionally, means may be provided for supplying the alcohol to the dissociator automatically in response to separation of the alcohol from the gasoline, if it should occur in the fuel tank.

In the drawings, wherein like reference characters are used throughout to designate like parts:

FIG. 1 is a diagrammatic illustration of a spark-ignited internal combustion engine having a fuel system constructed in accordance with the present invention; and FIG. 2 is an enlarged diagrammatic illustration of the dissociator of the system.

With reference now to the details of FIG. 1, the spark-ignited internal combustion engine 10 is supplied with fuel by means of a fuel system which includes an induction system 18 having a conventional carburetor in which gasoline may be atomized, and requiring a minimum alteration of an intake manifold into which the alcohol vapors may be introduced, and from which the fuel may be supplied to the engine through line 17. The system also includes a tank 12 in which the blend of alcohol and gasoline may be stored; and in accordance with this invention, this tank may be a conventional fuel tank of a vehicle powered by the engine 10.

Normally, the gasoline and alcohol phases will not separate in the tank 12, but will be supplied through a line 13 to another tank 14 in which they are caused to separate. When separated from the alcohol, the gasoline is supplied to the carburetor of induction system 18 by means of a pump 16 within supply line 15 connecting separator tank 14 with the carburetor. The pump may also be a conventional part of the standard fuel system used when gasoline is the only fuel.

The gasoline and alcohol are caused to separate by the introduction to the tank 14 of water through a line 19. Water may be supplied from condensation in the exhaust pipe 21 leading from engine 10, and, for this purpose, the supply line 19 connects tank 14 with the exhaust pipe, as shown in FIG. 1.

The alcohol is withdrawn from separator tank 14 by means of a pump 20 in a line 40 connecting tank 14 with a dissociator 22, where, as previously described, the alcohol is dissociated into its vapors. A small amount of water may be carried with the alcohol from separator tank 14 to dissociator 22, which may be helpful in causing a decrease in carbon particle formation and a slight increase in hydrogen vapor formation. The vapors are then supplied to the intake manifold of the induction system 18 through line 22A connecting the dissociator therewith. The vapors and atomized gasoline are mixed within the manifold, and the mixture then supplied to the engine 10 through line 17 connecting the manifold to the engine for providing fuel to operate the engine.

As also shown in FIG. 1, a line 41 connects fuel tank 12 to supply line 40 upstream of the pump 20 so as to supply alcohol to the dissociator 22 in the event it separates from the gasoline in the fuel tank 12. For this purpose, a valve 24 in line 41 is caused to open automatically in response to separation in the fuel tank which is sensed by suitable means connecting with the valve through a line 26.

As best shown in FIG. 2, dissociator 22 includes a chamber 30 disposed concentrically within an enlarged portion 28 of the exhaust pipe 21. The chamber 30 has an inlet at one end to which supply line 40 is connected and an outlet at its opposite end to which supply line 22A leading to the induction system is connected. The intermediate portion 32 of the chamber is filled with steel wire mesh through which the alcohol is caused to pass from the inlet to the outlet of the chamber.

During passage through the chamber 32, the alcohol is vaporized by virtue of the heat alone resulting from the circulation of the exhaust in heat exchange relation about the chamber 30. A chamber of this sort, in which vaporization dissociation occurs solely in response to heat, and thus without the need for catalysts, is known as a thermal pyrolysis chamber. The wire mesh within the intermediate portion of the chamber provides large surface areas which the alcohol is caused to contact and thus promote vaporization.

As previously described, this invention contemplates, in its broadest aspects, that the synthetic fuel may use a hydrocarbon alcohol of 1 to 3 carbon atoms, including not only methanol (methyl alcohol), but also ethyl alcohol, propyl alcohol and isopropyl alcohol. Methanol is preferred, however, for one reason because of its ability to dissociate in response to the heat and temperature provided by the exhaust of engine 10, which normally varies from 900° F. to 1150° F. It was found that methanol begins dissociating around 600° F. and sufficient heat transfer takes place in dissociator 22 to cause continuous dissociation of methanol without use of a catalyst at all demand rates of induction system 18. In particular, the methanol is dissociated into vapors which include hydrogen, carbon monoxide and carbon dioxide. In this system, it has been determined that the dissociation of methanol results in a vapor composition, by volume, of 60 to 65 percent hydrogen, 20 to 25 percent carbon monoxide, 5 to 15 percent carbon dioxide and 5 to 10 percent methane. Filter 23 is disposed within line 22A leading from the dissociator to the induction system for the purpose of removing carbon particles from the dissociated vapors.

As shown, baffles 34 are provided on the inner surface of the enlarged portion 28 of the exhaust pipe, and on the outer surfaces of chamber 30, in order that the dissociator will cooperate with the exhaust pipe in providing a muffling action for the exhaust.

As previously described, this invention further contemplates that the amount of vapors mixed with the atomized gasoline supplying fuel to the engine 10 may be regulated in response to the mass ratio of air to gasoline or to the engine load. For this purpose, pump 20 is of an electric type having its output controlled by a means. This means may be responsive to the air to gasoline mass ratio supplied the engine resulting from movement of the throttle by depression of an accelerator pedal 40, as when the carburetor is a fixed throat type. Or, this means may be responsive to the load on the engine resulting from movement of the throttle by depression of accelerator pedal 40, as when the carburetor is a variable throat type.

Power is supplied to the pump from a battery 42 through a variable resistor 36, and a slide 38 is connected to accelerator pedal 40 for movement as the latter is depressed so as to vary the potential from the battery to the pump. Thus, as the pedal is depressed to increase the amount of air flowing into engine 10, pump 20 is caused to supply less alcohol to the dissociator, which in turn supplies less vapors to the induction system 12.

It has been found that burning the vapors of methanol adversely affects the engine's efficiency at higher air to gas mass ratios and at higher engine loads, and varying the amount of methanol in the blend from 5 percent to 75 percent by volume will improve the engine efficiency. More particularly, this invention contemplates that if the supply of vapors to the induction system is discontinued, and only atomized gasoline supplied to the engine when the air to gasoline mass ratio is greater than 13 to 1 or the engine load is greater than 60 percent, this will improve the efficiency of the engine over that which would result from the use of the same blend used in a system which would supply alcohol continuously. The conventional induction system is inherently designed to provide the best specific gasoline consumption and the worst specific alcohol consumption at higher engine loads and air to gasoline mass ratios. Therefore, proper utilization of the alcohol-gasoline blend requires the discontinuation of the alcohol vapors at engine loads greater than 60 percent and air to gasoline mass ratios of greater than 13 to 1.

Since the amount of alcohol supplied to the dissociator is regulated, a surge tank 27 is disposed within supply line 40 upstream of the pump 20 and the connection to the supply line of the auxiliary line 41. Consequently, alcohol may be stored in the surge tank 27 when the pump is not being used, such as during highway driving with a medium engine load and a mass ratio of air to fuel of greater than 13 to 1. On the other hand, it provides an additional source of alcohol when the demand for it is increased, as previously described.

While the invention has been described in connection with a preferred embodiment and procedure, it will be understood that it is not intended to limit the invention to that particular embodiment and procedure. On the contrary, it is intended to cover all alternatives, modifications and equivalents as may be included within the spirit and scope of the invention as defined by the appended claims.

What is claimed is:

1. In a fuel system for a spark-ignited internal combustion engine having an induction system in which gasoline may be atomized, an exhaust, and means for supplying gasoline to a carburetor in the induction system for atomization; the improvement comprising a thermal pyrolysis chamber in heat exchange relation with the exhaust gases, means for circulating a liquid hydrocarbon alcohol of from 1 to 3 carbon atoms through the chamber in order to dissociate said alcohol into vapors including hydrogen, carbon monoxide and carbon dioxide in the absence of compressed air and solely in response to such heat and without need for catalysts, and then supplying the vapors to the induction system for mixing with the atomized gasoline to provide a fuel for the engine.

2. In a fuel system for a spark-ignited internal combustion engine, an induction system in which gasoline may be atomized, an exhaust, and means for supplying gasoline to the induction system for atomization; the improvement comprising means for dissociating substantially all of a liquid hydrocarbon alcohol of from 1 to 3 carbon atoms into vapors including hydrogen, carbon monoxide and carbon dioxide, the dissociating means including a pyrolysis chamber in heat exchange relation with the exhaust gases, and means for circulating the liquid alcohol through the pyrolysis chamber in order to produce such vapors solely in response to heat without the need for catalysts, and means for introducing the vapors to the induction system for mixing with the atomized gasoline to provide a fuel for the engine.

3. In a fuel system for a spark-ignited internal combustion engine having an induction system in which gasoline may be atomized, an exhaust, and means for supplying gasoline to a carburetor in the induction system for atomization; the improvement comprising a thermal pyrolysis chamber in heat exchange relation with the exhaust gases, means for circulating a liquid hydrocarbon alcohol of from 1 to 3 carbon atoms containing no more than a small amount of water through the chamber in order to dissociate said alcohol into vapors including hydrogen, carbon monoxide and carbon dioxide in the absence of compressed air and solely in response to such heat and without need for catalysts, and then supplying the vapors to the induction system for mixing with the atomized gasoline to provide a fuel for the engine.

4. In a fuel system for a spark-ignited internal combustion engine having an induction system in which gasoline may be atomized, an exhaust, and means for supplying gasoline to a carburetor in the induction system for atomization; the improvement comprising a thermal pyrolysis chamber in heat exchange relation with the exhaust gases, means for circulating a liquid hydrocarbon alcohol of from 1 to 3 carbon atoms through the chamber in order to dissociate substantially all of said alcohol into vapors including hydrogen, carbon monoxide and carbon dioxide in the absence of compressed air and solely in response to such heat and without need for catalysts, and then supplying the vapors to the induction system for mixing with the atomized gasoline to provide a fuel for the engine.

5. In a fuel system for a spark-ignited internal combustion engine having an induction system in which gasoline may be atomized, an exhaust, and means for supplying gasoline to the induction system for atomization; the improvement comprising a thermal pyrolysis chamber in heat exchange relation with the exhaust gases, means for circulating a liquid hydrocarbon alcohol of from 1 to 3 carbon atoms containing no more than a small amount of water through the chamber, said alcohol dissociating within said chamber into vapors including hydrogen, carbon monoxide and carbon dioxide solely in respone to such heat and without the need for catalysts, and then supplying the vapors to the induction system for mixing with the atomized gasoline to provide a fuel for the engine.

6. In a fuel system for a spark-ignited internal combustion engine, an induction system in which gasoline may be atomized, means for supplying gasoline to the induction system for atomization, means for dissociating a liquid hydrocarbon alcohol of from 1 to 3 carbon atoms into vapors including hydrogen, carbon monoxide and carbon dioxide, means for supplying the liquid alcohol to the dissociating means in order to produce such vapors and then supplying the vapors to the induction system for mixing with the atomized gasoline to provide a fuel for the engine, and means for regulating the amount of vapors mixed with the atomized gasoline in response to the mass ratio of air to gasoline being atomized, including means for supplying less dissociated vapors to the engine as the mass ratio of air to gasoline in the induction system increases and discontinuing the supply of vapors when the air to gasoline mass ratio becomes greater than 13 to 1.

7. The fuel system as set forth in claim 6, including means for supplying the dissociated vapors to the induction system only after the engine is started with gasoline alone.

8. In a fuel system for a spark-ignited internal combustion engine, an induction system in which the gasoline may be atomized, a fuel tank for storing a blend of gasoline and a liquid hydrocarbon alcohol of from 1 to 3 carbon atoms, a separator tank to receive the blend from the fuel tank and in which said blend separates into gasoline and liquid alcohol, means for supplying separated gasoline from the separator tank to the induction system through a first conduit means in order to atomize the gasoline, means for dissociating the liquid alcohol into vapors including hydrogen, carbon monoxide and carbon dioxide, means for supplying separated liquid alcohol from the separator tank to the dissociating means through a second conduit means separate from the first conduit means in order to produce such vapors, means for supplying the vapors to the induction system for mixing with the atomized gasoline to provide a fuel for the engine, and means for regulating the amount of vapors mixed with the atomized gasoline in response to the mass ratio of air to gasoline being atomized, including means for supplying less dissociated vapors to the engine as the mass ratio of air to gasoline in the induction system increases and discontinuing the supply of vapors when the air to gasoline mass ratio becomes greater than 13 to 1.

9. The fuel system as set forth in claim 8, including means for supplying the dissociated vapors to the induction system only after the engine is started with gasoline alone.

10. In a fuel system for a spark-ignited internal combustion engine, an induction system in which the gasoline may be atomized, a fuel tank for storing a blend of gasoline and a liquid hydrocarbon alcohol of from 1 to 3 carbon atoms, a separator tank to receive the blend from the fuel tank and in which said blend separates into gasoline and liquid alcohol, means for supplying separated gasoline from the separator tank to the induction system through a first conduit means in order to atomize the gasoline, means for dissociating the liquid alcohol into vapors including hydrogen, carbon monoxide and carbon dioxide, means for supplying separated liquid alcohol from the separator tank to the dissociating means through a second conduit means separate from the first conduit means in order to produce such vapors, means for supplying the vapors to the induction system for mixing with the atomized gasoline to provide a fuel for the engine, and means for regulating the amount of vapors mixed with the atomized gasoline in response to the load on the engine, including means for supplying less vapors to the engine as the mass ratio of air to gasoline in the induction system increases and discontinuing the supply of vapors when the engine load becomes greater than 60 percent.

11. The fuel system as set forth in claim 10, including means for supplying the dissociated vapors to the induction system only after the engine is started with gasoline alone.

12. In a fuel system for a spark-ignited internal combustion engine, an induction system in which gasoline may be atomized, means for supplying gasoline to the induction system for atomization, means for dissociating a liquid hydrocarbon alcohol of from 1 to 3 carbon atoms into vapors including hydrogen, carbon monoxide and carbon dioxide, means for supplying the liquid alcohol to the dissociating means in order to produce such vapors and then supplying the vapors to the induction system for mixing with the atomized gasoline to provide a fuel for the engine, and means for regulating the amount of vapors mixed with the atomized gasoline in response to the load on the engine, including means for supplying less vapors to the engine as the mass ratio of air to gasoline in the induction system increases and discontinuing the supply of vapors when the engine load becomes greater than 60 percent.

13. The fuel system as set forth in claim 12, including means for supplying the dissociated vapors to the induction system only after the engine is started with gasoline alone.

14. In a fuel system for a spark-ignited internal combustion engine, an induction system in which gasoline may be atomized, means for supplying gasoline to the induction system for atomization, means for dissociating a liquid hydrocarbon alcohol of from 1 to 3 carbon atoms into vapors including hydrogen, carbon monoxide and carbon dioxide, the dissociating means including a pyrolysis chamber for dissociating the alcohol in response to heat without the need for catalysts, means through which exhaust from the engine may be passed in heat exchange with said chamber, and means for circulating the liquid alcohol through the pyrolysis chamber in order to produce such vapors, means for introducing the vapors to the induction system for mixing with the atomized gasoline to provide a fuel for the engine, and means for regulating the amount of vapors mixed with the atomized gasoline in response to the mass ratio of air to gasoline being atomized, including means for supplying less dissociated vapors to the engine as the mass ratio of air to gasoline in the induction system increases and discontinuing the supply of vapors when the air to gasoline mass ratio becomes greater than 13 to 1.

15. The fuel system as set forth in claim 14, including means for supplying the dissociated vapors to the induction system only after the engine is started with gasoline alone.

16. In a fuel system for a spark-ignited internal combustion engine, an induction system in which gasoline may be atomized, means for supplying gasoline to the induction system for atomization, means for dissociating a liquid hydrocarbon alcohol of from 1 to 3 carbon atoms into vapors including hydrogen, carbon monoxide and carbon dioxide, the dissociating means including a pyrolysis chamber for dissociating the alcohol in response to heat without the need for catalysts, means through which exhaust from the engine may be passed in heat exchange with said chamber, and means for circulating the liquid alcohol through the pyrolysis chamber in order to produce such vapors, means for introducing the vapors to the induction system for mixing with the atomized gasoline to provide a fuel for the engine, and means for regulating the amount of vapors mixed with the atomized gasoline in response to the load on the engine, including means for supplying less vapors to the engine as the mass ratio of air to gasoline in the induction system increases and discontinuing the supply of vapors when the engine load becomes greater than 60 percent.

17. The fuel system as set forth in claim 16, including means for supplying the dissociated vapors to the induction system only after the engine is started with gasoline alone.

18. In a fuel system for a spark-ignited internal combustion engine having an induction system in which gasoline may be atomized, an exhaust, and means for supplying gasoline to a carburetor in the induction system for atomization; the improvement comprising a thermal pyrolysis chamber in heat exchange relation with the exhaust gases, means for circulating a liquid hydrocarbon alcohol of from 1 to 3 carbon atoms through the chamber in order to dissociate said alcohol into vapors including hydrogen, carbon monoxide and carbon dioxide solely in response to such heat and without need for catalysts, and then supplying the vapors to the induction system for mixing with the atomized gasoline to provide a fuel for the engine.

19. The fuel system of the character defined in claim 18, including means for regulating the amount of vapors mixed with the atomized gasoline to supply less vapors as the mass ratio of air to gasoline being atomized is increased.

20. The fuel system as set forth in claim 19, including means for supplying the dissociated vapors to the induction system only after the engine is started with gasoline alone.

21. The fuel system as set forth in claim 18, including means for regulating the amount of vapors mixed with the atomized gasoline to supply less vapors as the load on the engine is increased.

22. The fuel system as set forth in claim 21, including means for supplying the dissociated vapors to the induction system only after the engine is started with gasoline alone.

23. In a fuel system for a spark-ignited internal combustion engine, an induction system in which gasoline may be atomized, an exhaust, and means for supplying gasoline to the induction system for atomization; the improvement comprising means for dissociating a liquid hydrocarbon alcohol of from 1 to 3 carbon atoms into vapors including hydrogen, carbon monoxide and carbon dioxide, the dissociating means including a pyrolysis chamber in heat exchange relation with the exhaust gases, and means for circulating the liquid alcohol through the pyrolysis chamber in order to produce such vapors solely in response to heat without the need for catalysts, and means for introducing the vapors to the induction system for mixing with the atomized gasoline to provide a fuel for the engine.

24. The fuel system as set forth in claim 23, including means for regulating the amount of vapors mixed with the atomized gasoline to supply less vapors as the mass ratio of air to gasoline is increased.

25. The fuel system as set forth in claim 24, including means for supplying the dissociated vapors to the induction system only after the engine is started with gasoline alone.

26. The fuel system as set forth in claim 23, including means for regulating the amount of vapors mixed with the atomized gasoline to supply less vapors as the load on the engine is increased.

27. The fuel system as set forth in claim 26, including means for supplying the dissociated vapors to the induction system only after the engine is started with gasoline alone.

28. In a fuel system for a spark-ignited internal combustion engine having an induction system in which the gasoline may be atomized, and an exhaust; the improvement comprising a fuel tank for storing a blend of gasoline and a liquid hydrocarbon alcohol of from 1 to 3 carbon atoms, a separator tank to receive the blend from the fuel tank and in which said blend separates into gasoline and liquid alcohol, means for supplying separated gasoline from the separator tank to the induction system through a first conduit means in order to atomize the gasoline, a thermal pyrolysis chamber in heat exchange relation with the exhaust gases, means for supplying the liquid alcohol from the separator tank to the chamber through a second conduit means in order to dissociate said alcohol into vapors including hydrogen, carbon monoxide and carbon dioxide solely in response to such heat and without the need for catalysts, and means for supplying the vapors from the pyrolysis chamber to the induction system for mixing with the atomized gasoline to provide a fuel for the engine.

29. The fuel system set forth in claim 28, including means for supplying water from condensation in the exhaust into the separator tank to cause separation of the blend into gasoline and liquid alcohol.

30. The fuel system set forth in claim 28, including means automatically responsive to separation of the blend in the fuel tank for supplying alcohol directly to said pyrolysis chamber.

31. The fuel system as set forth in claim 28, including means for regulating the amount of vapors mixed with the atomized gasoline to supply less vapors as the mass ratio of air to gasoline is increased.

32. The fuel system as set forth in claim 31, including means for supplying the dissociated vapors to the induction system only after the engine is started with gasoline alone.

33. The fuel system as set forth in claim 28, including means for regulating the amount of vapors mixed with the atomized gasoline to supply less vapors as the load on the engine is increased.

34. The fuel system as set forth in claim 33, including means for supplying the dissociated vapors to the induction system only after the engine is started with gasoline alone.

* * * * *